United States Patent [19]

Merger

[11] 3,865,850

[45] Feb. 11, 1975

[54] 2-HYDROXY-3,3-DIMETHYL-4-OXOTETRAHYDROFURAN PRODUCTION

[75] Inventor: Franz Merger, Ludwigshafen, Germany

[73] Assignee: Badische Anilin- & Soda-Fabrik Aktiengesellschaft, Ludwigshafen/Rhein, Germany

[22] Filed: Mar. 2, 1973

[21] Appl. No.: 337,379

Related U.S. Application Data

[62] Division of Ser. No. 107,592, Jan. 18, 1971, abandoned.

[30] Foreign Application Priority Data

Jan. 28, 1970  Germany............................ 2003600

[52] U.S. Cl............... 260/347.8, 260/602, 424/285, 424/333

[51] Int. Cl............................................. C07d 5/04
[58] Field of Search................................. 260/347.8

[56] References Cited

UNITED STATES PATENTS 3,558,664  1/1971  Robinson et al................. 260/347.8

Primary Examiner—G. Thomas Todd
Attorney, Agent, or Firm—Johnston, Keil, Thompson & Shurtleff

[57] ABSTRACT

The production of aldolization products from isobutyraldehyde and glyoxal in the presence of a tertiary amine and the new aldolization products themselves.

6 Claims, No Drawings

2-HYDROXY-3,3-DIMETHYL-4-OXOTETRAHYDROFURAN PRODUCTION

RELATED APPLICATION

This application is a division of my copending application Ser. No. 107,592, filed Jan. 18, 1971, now abandoned.

The new compounds which can be prepared by the process according to the invention are pesticides and valuable starting materials for the production of pesticides.

The invention relates to a process for the production of aldolization products from isobutyraldehyde and glyoxal in the presence of tertiary amines, and to substances of the said type.

It is known that glyoxal and isobutyraldehyde can be converted into 2,2,4,4-tetramethyl-3,4-dihydroxyadipaldehyde in unsatisfactory yields (Sitzungsberichte 108 (1899), 545 to 546 and 116 (1907), 849 to 862). Isobutyraldehyde and glyoxal are reacted in the molar ratio 2:1 in aqueous potassium carbonate solution. Isobutyraldol (2,2,4-trimethyl-3-hydroxypentanal) is formed as a byproduct.

It is an object of this invention to provide a new process for the production of aldolization products from isobutyraldehyde and glyoxal in a simple manner and in good yields and high purity.

Another object of the invention are the new aldolization products of isobutyraldehyde and glyoxal.

I have now found that the production of aldolization products from isobutyraldehyde and glyoxal is advantageously carried out by reacting isobutyraldehyde and glyoxal in the presence of a tertiary amine.

The reaction may be represented by the following formulae:

tained from 2,2-dimethyl-3-hydroxysuccindialdehyde and isobutyraldehyde as a byproduct. Isobutyraldol and 2,2,4,4-tetramethyl-3,4-dihydroxyadipodialdehyde (compounds known as products of the reaction of glyoxal and isobutyraldehyde) are not formed in significant amounts as byproducts.

The starting materials are generally reacted in a molar ratio of isobutyraldehyde to glyoxal of 1:1 to 4:1, preferably 1:1 to 2:1. The reaction is carried out as a rule at a temperature of 10° to 150°C, preferably at from 40° to 95°C, at atmospheric or superatmospheric pressure, continuously or batchwise. It is preferred to use water as a solvent, particularly for dissolving the glyoxal. The amount of water in the reaction is generally from 35 to 60% by weight with reference to glyoxal. Solubilizers such as methanol, ethanol, dioxane or tetrahydrofuran may also be added.

Tertiary monoamines or polyamines or ion exchangers containing tertiary amino groups and having a $K_B$ value which is greater than $10^{-6}$ are used as catalysts. The reaction is advantageously carried out with at least 0.02 molar equivalents, preferably from 0.05 to 0.1 molar equivalents, of amine per mole of isobutyraldehyde and using the catalyst in heterogeneous phase (preferably ion exchangers). Examples of suitable amines are trimethylamine, triethylamine, tributylamine, methyldiethylamine, methyldiisopropylamine, dimethyltertiary-butylamine, N,N'-tetramethylethylenediamine, dimethylcyclohexylamine, N-methylpyrrolidine, N-methylpiperidine, N,N'-dimethylpiperazine, N-methylmorpholine, and diazabicyclo-(2,2,2)-octane. Examples of suitable basic ion exchangers are poly-(dimethylaminoalkyl)-styrenes and poly-(dimethylaminoalkyl)-acrylamides, preferably in the conventional macroporous form. Reference is made to Houben-Weyl, "Methoden der organischen Chemie," volume I, 1, pages 525 et seq) as regards the production and use of ion exchangers. The starting materials are reacted in homogeneous or heterogeneous phase, the liquid or solid catalysts being if desired used together with a suitable solvent, for example

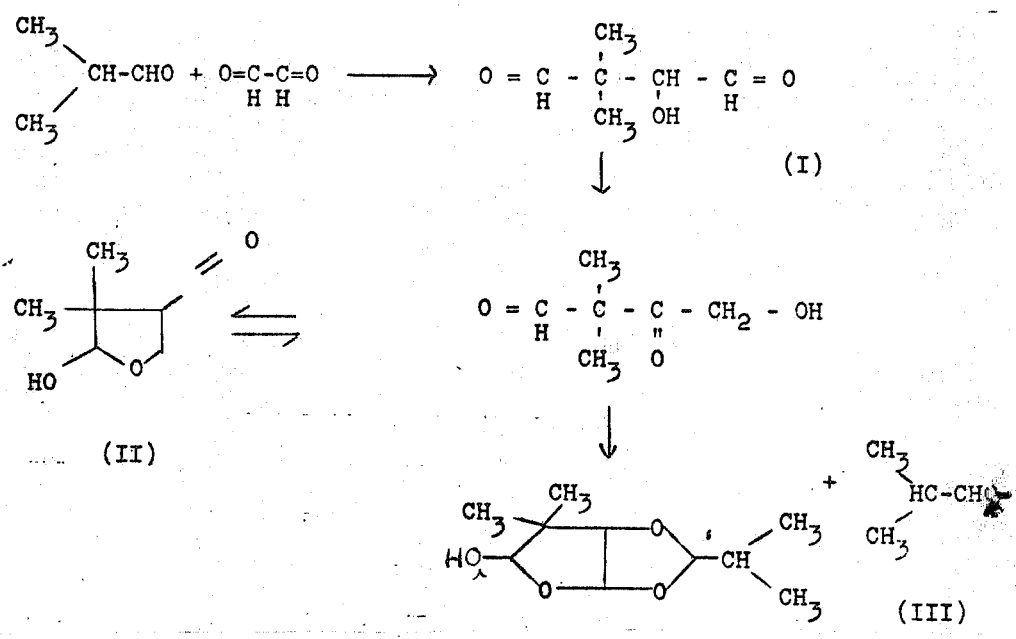

The process according to the invention gives in a simple manner the new aldolization products 2,2-dimethyl-3-hydroxysuccindialdehyde and 2-hydroxy-3,3-dimethyl-4-oxotetrahydrofuran in good yields and high purity. An aldoxane (namely 3-isopropyl-7-hydroxy-8,8-dimethyl-2,4,6-trioxabicyclo-[3,0,3]-octane is obone of the abovementioned solubilizers or dimethylformamide.

The reaction may be carried out as follows: A mixture of the starting materials, catalyst, water and any solubilizer used is kept at the reaction temperature for from 10 minutes to 12 hours while mixing well. The end product is then isolated from the reaction mixture by a conventional method, for example by filtration, fractional distillation and crystallization. Mixtures of 2,2-dimethyl-3-hydroxysuccindialdehyde and 2-hydroxy-3,3-dimethyl-4-oxotetrahydrofuran are generally obtained, often in a molar ratio of 0.1:1 to 2:1. Low reaction temperatures, for example from 10° to 50°C, short reaction periods, for example of from 10 to 60 minutes, and the use of the catalyst in heterogeneous phase (preferably ion exchangers) favor the production of 2,2-dimethyl-3-hydroxysuccindialdehyde, while higher temperatures, longer reaction periods and a homogeneous phase favor the production of the other end product. Under conditions which favor the production of 2,2-dimethyl-3-hydroxysuccindialdehyde, the by-product 3-isopropyl-7-hydroxy-8,8-dimethyl-2,4,6-trioxabicyclo-[3,0,3] -octane is formed in an amount of about 1 to 10%. Above the preferred molar ratio of 1 to 2 moles of isobutyraldehyde to 1 mole of glyoxal and the said reaction periods, 3-isopropyl-7-hydroxy-8,8-dimethyl-2,4,6-trioxabicyclo-[3,0,3]-octane is obtained in yields of up to 40 % with reference to glyoxal.

If the 2,2-dimethyl-3-hydroxysuccindialdehyde is separated by distillation (after filtration and neutralization of the catalyst) and again reacted under the conditions of the process according to the invention with the catalyst, 2-hydroxy-3,3-dimethyl-4-oxotetrahydrofuran is obtained by rearrangement.

The new compounds which can be prepared by the process according to the invention are pesticides and valuable starting materials for the manufacture of pesticides. 2,2-dimethyl-3-hydroxysuccindialdehyde and 2-hydroxy-3,3-dimethyl-4-oxotetrahydrofuran are effective against the common housefly in amounts of only about 2 milligrams. 2-hydroxy-3,3-dimethyl-4-oxotetrahydrofuran and 3-isopropyl-7-hydroxy-8,8-dimethyl-2,4,5-trioxabicyclo-[3,0,3]-octane are active against aspergillus in 0.01% solution and 2,2-dimethyl-3-hydroxysuccindialdehyde has good tanning action on calf pelt when the latter is milled for 12 hours in a 15% aqueous solution at pH 9.

The following examples illustrate the invention. The parts given in the examples are parts by weight. They bear the same relationship to parts by volume as the kilogram to the liter.

EXAMPLE 1

725 parts of a 40% by weight aqueous solution of glyoxal and 360 parts of isobutyraldehyde are mixed with 50 parts of triethylamine during 20 minutes at 50°C with vigorous stirring and heated under reflux until the boiling temperature has risen to 93° to 95°C (3 hours). The mixture is then fractionally distilled at 1 mm Hg. 39.4 parts of 2,2-dimethyl-3-hydroxysuccindialdehyde having a boiling range from 100° to 110°C and 524 parts of 2-hydroxy-3,3-dimethyl-4-oxotetrahydrofuran having a boiling point of 90° to 92°C and a melting point of 36° to 38°C (from a mixture of methylene chloride and petroleum ether) are obtained. Both end products are soluble in water. Analytical data agree with the calculated values.

EXAMPLE 2

145 parts of a 40% by weight aqueous glyoxal solution and 86 parts of isobutyraldehyde are boiled for an hour under nitrogen with vigorous stirring in the presence of 150 parts by volume of poly-(dimethylaminoalkylstyrene), i.e. an ion exchanger obtainable commercially under the registered Trade Mark LEWATIT MP 62. The reaction mixture is filtered and fractionated at subatmospheric pressure. 61.1 parts of 2,2-dimethyl-3-hydroxysuccindialdehyde having a boiling point of 100° to 105°C at 1 mm Hg, equivalent to 47% of the theory with reference to glyoxal used, 19.5 parts of 2-hydroxy-3,3-dimethyl-4-oxotetrahydrofuran having a boiling point of 90° to 92°C at 1 mm Hg, equivalent to 15% of the theory, and 6 parts of 3-isopropyl-7-hydroxy-8,8-dimethyl-2,4,6-trioxabicyclo-[3,0,3]-octane having a boiling point of 108° to 110°C at 1 mm Hg, equivalent to 4.5% of the theory with reference to glyoxal, are obtained. 3-isopropyl-7-hydroxy-8,8-dimethyl-2,4,6-trioxabicyclo-3,0,3-octane is very sparingly soluble in water. After it has been recrystallized from petroleum ether it has a melting point of 49° to 51°C. Analytical data agree with the calculated values.

I claim:

1. A process for production of 2-hydroxy-3,3-dimethyl-4-oxotetrahydrofuran which consists essentially of reacting isobutyraldehyde and glyoxal at a molar ratio of 1:1 to 4:1, respectively, at 10°–150°C. in the presence of 0.02 to 0.1 mol equivalents of a tertiary amine per mol of isobutyraldehyde and in the presence of 35–60% by weight of water with reference to the glyoxal to obtain as reaction products a mixture of 2,2-dimethyl-3-hydroxysuccinaldehyde and 2-hydroxy-3,3-dimethyl-4-oxotetrahydrofuran, and separating the latter compound from the reaction mixture.

2. A process as claimed in claim 1 wherein said molar ratio is 1:1 to 2:1.

3. A process as claimed in claim 1 wherein said temperature is 40°–95°C.

4. A process as claimed in claim 1 wherein said tertiary amine has a $K_B$ value greater than $10^{-6}$.

5. A process as claimed in claim 1 wherein said tertiary amine is a member selected from the group consisting of trimethylamine, triethylamine, tributylamine, methyldiethylamine, methyldiisopropylamine, dimethyl-tertiary-butylamine, N,N'-tetramethylethylenediamine, dimethylcyclohexylamine, N-methylpyrrolidine, N-methylpiperidine, N,N'-dimethylpiperazine, N-methylmorpholine, and diazobicyclo-(2,2,2)-octane.

6. A process as claimed in claim 1 wherein said tertiary amine is in the form of particles of a basic, macroporous, solid polymer having tertiary amine ion exchange groups.

* * * * *